US008827858B2

(12) United States Patent
Rodgers, II

(10) Patent No.: US 8,827,858 B2
(45) Date of Patent: Sep. 9, 2014

(54) GEAR ASSEMBLY FOR MULTI-SPEED COUNTERSHAFT TRANSMISSION

(75) Inventor: Dane L. Rodgers, II, Avon, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 472 days.

(21) Appl. No.: 13/182,928

(22) Filed: Jul. 14, 2011

(65) Prior Publication Data

US 2012/0122623 A1    May 17, 2012

Related U.S. Application Data

(63) Continuation-in-part of application No. 12/182,393, filed on Jul. 30, 2008, now Pat. No. 8,075,437.

(51) Int. Cl.
*F16H 37/04*     (2006.01)
*F16H 3/08*      (2006.01)
*F16H 3/093*     (2006.01)

(52) U.S. Cl.
CPC ...... *F16H 37/046* (2013.01); *F16H 2200/0069* (2013.01); *F16H 2003/0931* (2013.01); *F16H 2200/0086* (2013.01)
USPC ................ 475/218; 74/325; 74/331

(58) Field of Classification Search
CPC ................. F16H 37/046; F16H 3/006; F16H 2003/0931; F16H 3/097; F16H 2200/0086; F16H 2003/123; F16H 2200/2048; F16H 2200/069
USPC ............ 74/330, 331, 332, 333, 340; 475/218, 475/302, 303, 317, 329, 343
See application file for complete search history.

(56) References Cited

U.S. PATENT DOCUMENTS

| | | | |
|---|---|---|---|
| 3,589,483 A * | 6/1971 | Smith | 192/3.52 |
| 3,974,719 A | 8/1976 | Tiliander | |
| 4,070,927 A | 1/1978 | Polak | |
| 4,614,133 A | 9/1986 | Nerstad et al. | |
| 4,693,129 A | 9/1987 | Pierce | |
| 4,738,149 A * | 4/1988 | Janiszewski | 74/330 |
| 5,041,062 A | 8/1991 | Dornhoff | |
| 5,385,064 A | 1/1995 | Reece | |
| 5,421,216 A | 6/1995 | Stine | |
| 5,591,097 A | 1/1997 | Petri et al. | |
| 5,823,051 A * | 10/1998 | Hall, III | 74/325 |
| 5,881,600 A | 3/1999 | Fan | |
| 5,971,883 A * | 10/1999 | Klemen | 475/296 |
| 7,070,534 B2 * | 7/2006 | Pelouch | 475/214 |
| 7,104,917 B2 * | 9/2006 | Klemen et al. | 475/302 |
| 7,311,630 B2 | 12/2007 | Borgerson | |
| 7,313,981 B2 | 1/2008 | Gumpoltsberger | |
| 7,470,206 B2 * | 12/2008 | Rodgers, II | 475/218 |
| 7,490,526 B2 * | 2/2009 | Forsyth | 74/330 |

(Continued)

*Primary Examiner* — Troy Chambers
*Assistant Examiner* — Valentin Craciun
(74) *Attorney, Agent, or Firm* — Barnes & Thornburg LLP

(57) ABSTRACT

A multi-speed countershaft transmission for a vehicle is provided. The transmission includes a main shaft and countershaft gears that receive input directly from an input member. A plurality of torque transmitting mechanisms may be selectively applied to synchronize a range gear to a countershaft. The countershaft transfers torque to an output gear set, which may transfer torque to a planetary gear set. The available range gears include a plurality of forward speed ratios and at least one reverse speed ratio. One or more power take-off sections may also be provided.

One or more other torque transmitting mechanisms may be selectively applied to bypass the countershaft and/or to couple the planet carrier of the planetary gear set to another component of the planetary gear set.

19 Claims, 5 Drawing Sheets

(56) References Cited

U.S. PATENT DOCUMENTS

| | | |
|---|---|---|
| 7,581,461 B2 | 9/2009 | Matsushita |
| 7,597,644 B2 * | 10/2009 | Rodgers, II .................. 475/218 |
| 7,604,561 B2 | 10/2009 | Earhart |
| 7,748,286 B2 | 7/2010 | Baldwin |
| 7,762,154 B2 | 7/2010 | Murakami et al. |
| 7,832,299 B2 | 11/2010 | Kobayashi et al. |
| 7,837,589 B2 * | 11/2010 | Earhart .......................... 475/302 |
| 7,846,055 B2 | 12/2010 | Earhart |
| 8,142,322 B2 * | 3/2012 | Raszkowski .................. 475/207 |
| 8,197,380 B2 * | 6/2012 | Heinzelmann ................ 475/302 |
| 8,398,519 B2 * | 3/2013 | Raszkowski .................. 475/207 |
| 2007/0240530 A1 | 10/2007 | Ogami et al. |
| 2007/0277635 A1 | 12/2007 | Komori |
| 2008/0045373 A1 * | 2/2008 | Rodgers, II .................. 475/319 |
| 2008/0107317 A1 | 5/2008 | Jeong et al. |
| 2008/0134818 A1 | 6/2008 | Gitt |
| 2008/0161154 A1 | 7/2008 | Bjorck et al. |
| 2008/0182700 A1 * | 7/2008 | Earhart .......................... 475/207 |
| 2008/0236317 A1 | 10/2008 | Matsushita et al. |
| 2009/0203482 A1 * | 8/2009 | Earhart .......................... 475/207 |
| 2009/0203483 A1 * | 8/2009 | Earhart .......................... 475/207 |
| 2009/0203484 A1 * | 8/2009 | Earhart .......................... 475/207 |
| 2010/0319485 A1 | 12/2010 | Miller et al. |

* cited by examiner

| RANGE | C1 | C2 | C3 | C4 | C5 | C6 | C7 | SYNCHRO |
|---|---|---|---|---|---|---|---|---|
| R2 |  | X |  |  |  |  | X | R |
| R1 | X | X |  |  |  |  |  | R |
| 1 |  |  |  |  |  | X |  | R OR F |
| 2 |  | X |  |  |  | X |  | F |
| 3 |  |  | X |  |  | X |  | R OR F |
| 4 |  |  |  | X |  | X |  | R OR F |
| 5 |  |  |  |  | X | X |  | R OR F |
| 6 | X |  |  |  |  | X |  | R OR F |
| 7 |  | X |  |  |  |  | X | F |
| 8 |  |  | X |  |  |  | X | R OR F |
| 9 |  |  |  | X |  |  | X | R OR F |
| 10 |  |  |  |  | X |  | X | R OR F |

FIG. 3

GEAR ASSEMBLY FOR MULTI-SPEED COUNTERSHAFT TRANSMISSION

RELATED APPLICATIONS

This application is a continuation-in-part of and claims priority to U.S. patent application Ser. No. 12/182,393, filed Jul. 30, 2008, which is incorporated herein by this reference.

TECHNICAL FIELD

The present disclosure relates generally to transmissions for motor vehicles, and more particularly to gear assemblies for multiple speed countershaft transmissions.

BACKGROUND

Motor vehicles are powered by a drive unit, such as an internal combustion engine or an engine-electric motor combination. The drive unit provides a torque output. In vehicles equipped with automatic transmissions, a fluid coupling, such as a torque converter or similar apparatus, transfers the torque from the drive unit to the transmission.

The transmission enables the vehicle to assume a number of different operating modes, ranges, or ratios. In many cases, the transmission provides a number of different forward speed ratios, in addition to neutral and at least one reverse speed ratio.

The transmission includes at least one gear assembly and a plurality of torque transmitting mechanisms such as friction devices, which may include one or more clutches and/or brakes. Typically, an electro-hydraulic control system controls the application or engagement and release or disengagement of the torque transmitting mechanisms, to cause shifts from one range, ratio or mode to another range, ratio or mode in the transmission.

Countershaft transmissions are a type of transmission used in motor vehicles, particularly in commercial vehicles. A variety of countershaft transmissions currently exist. Many currently known countershaft transmissions include a main shaft, and at least one headset gear, which receives torque input from the torque converter turbine or similar apparatus and transfers it to a countershaft. Some existing countershaft transmissions also include a direct shaft, in addition to the main shaft, which bypasses the countershafts and supplies input directly to an output planetary gear set.

SUMMARY

A vehicle transmission has one or more of the features recited in the appended claims and/or the following features which, alone or in any combination, may comprise patentable subject matter.

According to one aspect of the present invention, this disclosure describes a transmission for use in a vehicle powertrain, where the powertrain includes a drive unit configured to provide rotational power and a torque transferring apparatus interposed between the transmission and the drive unit. The transmission includes a main shaft having an input end, an output end spaced from the input end, and at least one main shaft gear positioned between the input end and the output end for common rotation with the main shaft. The input end of the main shaft is configured to receive torque output from the torque transferring apparatus. At least one countershaft is spaced from and substantially parallel to the main shaft. At least one countershaft gear is selectively rotatable about the at least one countershaft and intermeshing with a main shaft gear. An output gear set is also included, which provides a first output gear concentric with and rotatable about the output end of the main shaft and at least one second output gear coupled for common rotation with the at least one countershaft and intermeshing with the first output gear. The first and second output gears are configured to multiply torque received from the at least one countershaft at the output end of the main shaft.

The transmission may include a planetary gear set concentric with and rotatable about the output end of the main shaft. The planetary gear set may be configured to receive torque output from the output gear set and to output torque to an output member, wherein the output member is configured to drive a vehicle load. The output member may have an output member axis and the main shaft may have a main shaft axis. The output member axis and the main shaft axis may be generally aligned.

The input end of the main shaft may be directly connected to a first end of a transmission input shaft. A second end of the transmission input shaft may be connected to the torque transferring apparatus. The transmission input shaft may have a transmission input shaft axis. The transmission input shaft axis, the main shaft axis, and the output member axis may be generally aligned.

The transmission may include a plurality of torque transmitting mechanisms, at least one of which is configured to selectively couple the at least one countershaft gear to the at least one countershaft for common rotation with the at least one countershaft and at least one of which is configured to selectively couple a portion of the planetary gear set for common rotation with at least one of the main shaft and the first output gear of the output gear set. One of the torque transmitting mechanisms may be shared by at least one reverse speed ratio and at least one forward speed ratio. The transmission may include a reverse idler and a synchronizer, which may be concentric with and rotatable about a countershaft to provide the at least one reverse speed ratio.

According to another aspect of the present invention, a transmission for use in a vehicle powertrain is provided. The transmission includes a main shaft having an input end and an output end spaced from the input end, a countershaft spaced from and substantially parallel to the main shaft, and a first gear set spaced from the input end of the main shaft by a first distance. The first gear set comprises a first main shaft gear concentric with and coupled for common rotation about the main shaft and a first countershaft gear concentric with and rotatable about the countershaft. The first countershaft gear is coplanar with and intermeshing the first main shaft gear.

The transmission also includes a first torque transmitting mechanism supported by the countershaft and engageable to selectively couple the first countershaft gear for common rotation with the countershaft.

The transmission also includes a second gear set spaced from the input end of the main shaft by a second distance. The second distance is greater than the first distance. The second gear set comprises a first gear concentric with and rotatable about the main shaft and a second gear coupled for common rotation with the countershaft. The second gear is coplanar with and continuously intermeshing the first gear of the second gear set. The second gear set is operably coupled to an output member configured to drive a vehicle load.

The first gear of the second gear set may be coupled for common rotation with a first end of a sleeve shaft and the sleeve shaft may be concentric with and rotatable about the main shaft. The sleeve shaft may have a second end spaced from the first end, and the second end of the sleeve shaft may be coupled for common rotation with a hub member of a planetary gear set.

The planetary gear set may be spaced from the input end of the main shaft by a third distance, and the third distance may be greater than the second distance. The output member may be coupled for common rotation with a carrier member of the planetary gear set.

The transmission may include a second torque transmitting mechanism supported by the hub member of the planetary gear set. The second torque transmitting mechanism may be selectively engageable to couple the planetary gear set for common rotation with the first gear of the second gear set. The transmission may include a third torque transmitting mechanism that may be selectively engageable to couple the planetary gear set for common rotation with the main shaft. The transmission may be configured so that there are no gear sets that have a distance from the input end of the main shaft that is less than the first distance.

The transmission may include a second countershaft spaced from and substantially parallel to the main shaft and the first countershaft. The first gear set may include a second countershaft gear concentric with and rotatable about the second countershaft. The second countershaft gear may be coplanar with the first main shaft gear and the first countershaft gear.

According to another aspect of the present invention, a vehicle transmission is provided, including a main shaft having an input end and an output end spaced from the input end, where the input end is directly connectable to a transmission input. The transmission includes a plurality of main shaft gears connected for common rotation with the main shaft, first and second countershafts spaced from and substantially parallel to the main shaft, and a plurality of first countershaft gears concentric with and rotatable about the first countershaft. Each of the first countershaft gears is coplanar with and continuously intermeshing a main shaft gear. The transmission also includes a reverse idler gear coplanar with and continuously intermeshing a main shaft gear, and a plurality of second countershaft gears concentric with and rotatable about the second countershaft. Each of the second countershaft gears is coplanar with a main shaft gear, and at least the first countershaft gears are driven by the transmission input.

The transmission may include a plurality of torque transmitting mechanisms and a synchronizer actuatable to provide a plurality of forward speed ratios and a reverse speed ratio between the input end and the output end of the main shaft. The transmission may include an output gear set and a planetary gear set. Each of the output gear set and planetary gear set may be concentric with and rotatable about the output end of the main shaft to double the number of speed ratios provided between the input end and the output end of the main shaft. The transmission may include first and second countershaft gears continuously intermeshing first and second main shaft gears and third and fourth countershaft gears continuously intermeshing third and fourth main shaft gears. The transmission may include a plurality of power take-off locations between the input end and the output end of the main shaft.

According to another aspect of the present disclosure, a transmission for use in a vehicle powertrain is disclosed. The vehicle power train may include a drive unit configured to provide rotational power and a torque transferring apparatus interposed between the transmission and the drive unit. The transmission may include a main shaft, at least one countershaft, at least one countershaft gear, a sleeve shaft, and an output gear shaft. The main shaft may have an input end, an output end spaced from the input end, and at least one main shaft gear positioned between the input end and the output end for common rotation with the main shaft. The input end of the main shaft may be configured to receive torque output from the torque transferring apparatus. The at least one countershaft may be spaced from and substantially parallel to the main shaft. The at least one countershaft gear may be selectively rotatable about the at least one countershaft and may intermesh with the at least one main shaft gear. The sleeve shaft may be concentric with and rotatable about the output end of the main shaft. The output gear set may include a first output gear coupled for common rotation with the sleeve shaft and a second output gear coupled for common rotation with one of the at least one countershaft gears. The second output gear may also intermesh with the first output gear. The first output gear may be the only gear coupled to the sleeve shaft and intermeshing with a gear coupled for common rotation with one of the at least one countershafts. One of the at least one main shaft gears may intermesh with only one of the at least one countershaft gears.

In some embodiments, the at least one countershaft may include a first countershaft and a second countershaft. The second output gear may be coupled for common rotation with the first countershaft. The output gear set may include a third output gear coupled for common rotation with the second countershaft and intermeshing with the first output gear. The first output gear, the second output gear, and the third output gear may be situated in substantially the same plane.

The transmission may also include a planetary gear set concentric with and rotatable about the output end of the main shaft. It is contemplated that the planetary gear set may be configured to receive torque output from the output gear set and to output torque to an output shaft. The output shaft may be configured to drive a vehicle load.

It is contemplated that the first output gear may be concentric with and rotatable about the output end of the main shaft. The output shaft may have an output shaft axis and the main shaft may have a main shaft axis. The output shaft axis and the main shaft axis may be generally aligned. The planetary gear set may include a gear carrier supporting a plurality of planet gears and the output shaft may be coupled for common rotation with the gear carrier. The gear carrier may be selectively held for rotation with the sleeve shaft.

According to another aspect of the present disclosure, a vehicle transmission may include a main shaft, a plurality of countershafts, at least one countershaft gear, a planetary gear set, a first torque transmitting mechanism, and an output shaft. The main shaft may have an input end, an output end spaced from the input end, and at least one main shaft gear positioned between the input end and the output end. The main shaft gear may be coupled for common rotation with the main shaft. The plurality of countershafts may be spaced from and substantially parallel to the main shaft. The at least one countershaft gear may be selectively rotatable about one of the plurality of countershafts and the at least one countershaft gear may intermesh with the at least one main shaft gear. The planetary gear set may include a plurality of planet gears and a gear carrier. The gear carrier may be rotatable about the output end of the main shaft and may support the plurality of planet gears. The first torque transmitting mechanism may be selectively engageable to hold the gear carrier stationary relative to the planet gears. The output shaft may be coupled to the gear carrier for rotation therewith.

In some embodiments, the transmission may also include a sleeve shaft and an output gear set. The sleeve shaft may be concentric with and rotatable around the output end of the main shaft. The output gear set may include a first output gear coupled for rotation with the sleeve shaft and a second output gear coupled for rotation with one of the plurality of countershafts. The second output gear may intermesh with the first output gear. The planetary gear set may be situated between the output gear set and the output shaft. The first torque transmitting mechanism may selectively lock the gear carrier to the sleeve shaft for common rotation therewith. The first torque transmitting mechanism may be supported by and rotate with the sleeve shaft. The planetary gear set may include a sun gear, and the first torque transmitting mechanism may be arranged to selectively hold the gear carrier for common rotation with the sun gear.

The transmission may also include a second torque transmitting mechanism that selectively locks the sleeve shaft to the main shaft for common rotation therewith. The second torque transmitting mechanism may be supported by and rotate with the main shaft. The second torque transmitting mechanism may be nested within the diameter of the first torque transmitting mechanism.

It is contemplated that the planetary gear set may include a ring gear, and the first torque transmitting mechanism may selectively hold the gear carrier for common rotation with the ring gear. The first torque transmitting mechanism may be supported by and rotate with the ring gear.

The at least one main shaft gear may intermesh with only one gear selectively coupled for rotation about one of the plurality of countershafts. The first output gear may be the only gear coupled for rotation with the sleeve shaft and intermeshing with a gear coupled for rotation with one of the plurality of countershafts.

Patentable subject matter may include one or more features or combinations of features shown or described anywhere in this disclosure including the written description, drawings, and claims.

BRIEF DESCRIPTION OF THE DRAWINGS

The detailed description refers to the following figures in which:

FIG. 3 is a table illustrating one example of how torque transmitting mechanisms may be applied to achieve a plurality of forward speed ratios and at least one reverse speed ratio in a transmission including a gear assembly provided in accordance with the present invention;

DETAILED DESCRIPTION

Figure 1:
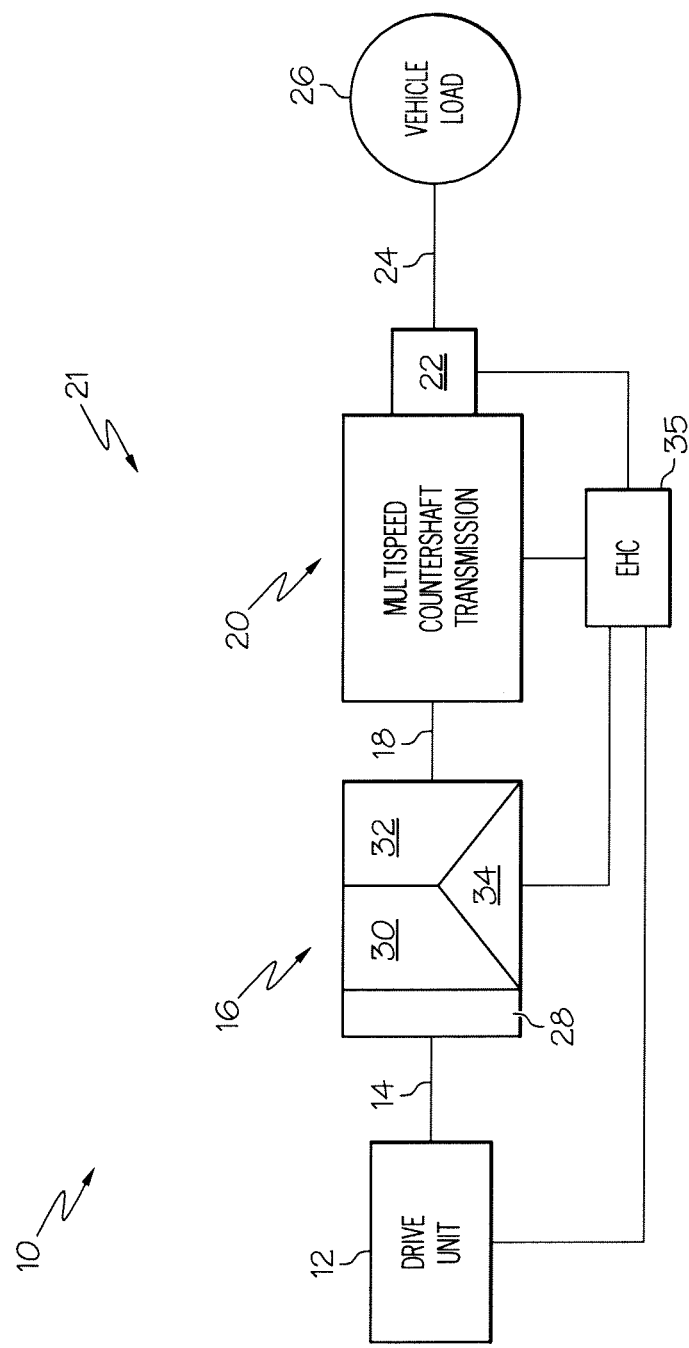
FIG. 1 is a simplified schematic diagram of a vehicle powertrain including a multi-speed countershaft transmission gear assembly, wherein the gear assembly is operably coupled to a transmission input member at an input end, a rear planetary gear set at an output end, and an electro-hydraulic control.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

This disclosure describes a gear assembly 20 for a countershaft transmission 21 of a vehicle. In FIG. 1, gear assembly 20 is depicted in the context of an exemplary automotive vehicle powertrain 10. It will be understood by those of ordinary skill in the art, however, that aspects of the present invention are applicable to other types of powertrain configurations.

The exemplary powertrain 10 includes a drive unit 12, a torque transferring apparatus 16, and transmission 21. Drive unit 12 provides torque output to shaft 14. Drive unit 12 may be an internal combustion engine of a compression-ignition type (i.e. diesel) or a spark-ignition type (i.e. gasoline), a "hybrid" engine-electric motor combination, or other source of rotational power.

Torque transferring apparatus 16 selectively establishes a coupling between drive unit 12 and transmission 21 to convert and/or transfer torque output from drive unit 12 to the vehicle transmission 21. In the exemplary powertrain 10, torque transferring apparatus 16 is a torque converter and includes a torque converter clutch 28, a pump 30, a turbine 32 and a stator 34. Torque may be multiplied between the pump 30 and the turbine 32 when the torque converter clutch 28 is not applied, as is well known. Turbine 32 outputs torque to transmission 21. While the exemplary powertrain 10 depicts a torque converter 16, it will be understood by those skilled in the art that other types of fluid couplings or similar apparatus may be used. In any event, torque transferring apparatus 16 outputs torque to shaft 18, which is the transmission input shaft or input member.

Transmission 21 has a plurality of operating modes, ranges or ratios, including at least one forward speed ratio, neutral and at least one reverse speed ratio. More particularly, in the illustrated embodiment, transmission 21 is operable to provide up to ten forward speed ratios and up to two reverse speed ratios. The up to ten forward speed ratios are provided by at least one direct range, a plurality of countershaft ranges and a plurality of planetary ranges. In the embodiment shown in FIG. 2, there are four countershaft ranges (C1, C2, C3 and C5), one direct range (C4) and two planetary ranges (C6 and C7). Thus, in the illustrated embodiment, the main shaft is effectively also the direct shaft, thereby eliminating the need for a separate direct shaft.

The countershaft ranges are attained by selectively applying the countershaft torque transmitting mechanisms, i.e., C1, C2, C3, and C5. The planetary ranges are attained by selectively applying the planetary torque transmitting mechanisms, i.e., C6 and C7, and the direct range is attained by selectively applying the direct torque transmitting mechanism, C4. One example of how torque transmitting mechanisms C1, C2, C3, C4, C5, C6 and C7 may be applied to achieve ten forward ratios and two reverse ratios is shown by the table of FIG. 3, which is described below. One of ordinary skill in the art will understand, however, that shift sequences may be modified or eliminated to obtain a particularly desired number of ratios, and that the gear ratios themselves may be modified. For example, shift sequences may be modified so that a range is skipped, thereby resulting in fewer forward speed ratios (i.e., nine instead of ten). Accordingly, aspects of the present invention are not limited to any particular configuration of shift sequences or to any specific set of gear ratios.

An electro-hydraulic control 35 controls the application and release of torque transmitting mechanisms (i.e. clutches, brakes, synchronizers and the like) of transmission 21 to accomplish shifting from one operating mode, range, or ratio to another operating mode, range or ratio. Such shifting may be commanded by electro-hydraulic control 35 in response to inputs such as drive unit speed (e.g., engine speed), transmission input speed, gear ratio, throttle position, driver requested torque, transmission output speed, and/or other factors.

Transmission 21 includes countershaft gear assembly 20 and a rear planetary gear set 22. Gear assembly 20 receives torque input via input shaft or member 18, as indicated by arrows 110, 112 of FIG. 2. Countershaft gear assembly 20 outputs torque to rear planetary gear set 22, as indicated by arrows 114, 116, 118. Rear planetary gear set 22 outputs torque to shaft or output member 24, as indicated by arrow 120, to drive a vehicle load 26.

Vehicle load 26 generally includes the drive wheels and driven load mass of the vehicle. The weight and other characteristics of vehicle load 26 may be quite considerable and/or vary considerably over the course of the vehicle's use, as may be the case with commercial vehicles such as trucks, buses, emergency vehicles, and the like. Vehicle load 26 may also include ancillary power-driven devices such as hydraulic lifts, towing apparatus and other equipment or features, such as those typically carried by special utility vehicles such as delivery trucks, tow trucks, snow plows, fire trucks, garbage trucks, buses, and the like. Such features may be driven by one or more power take-off (PTO) sections of transmission 21.

Figure 2:
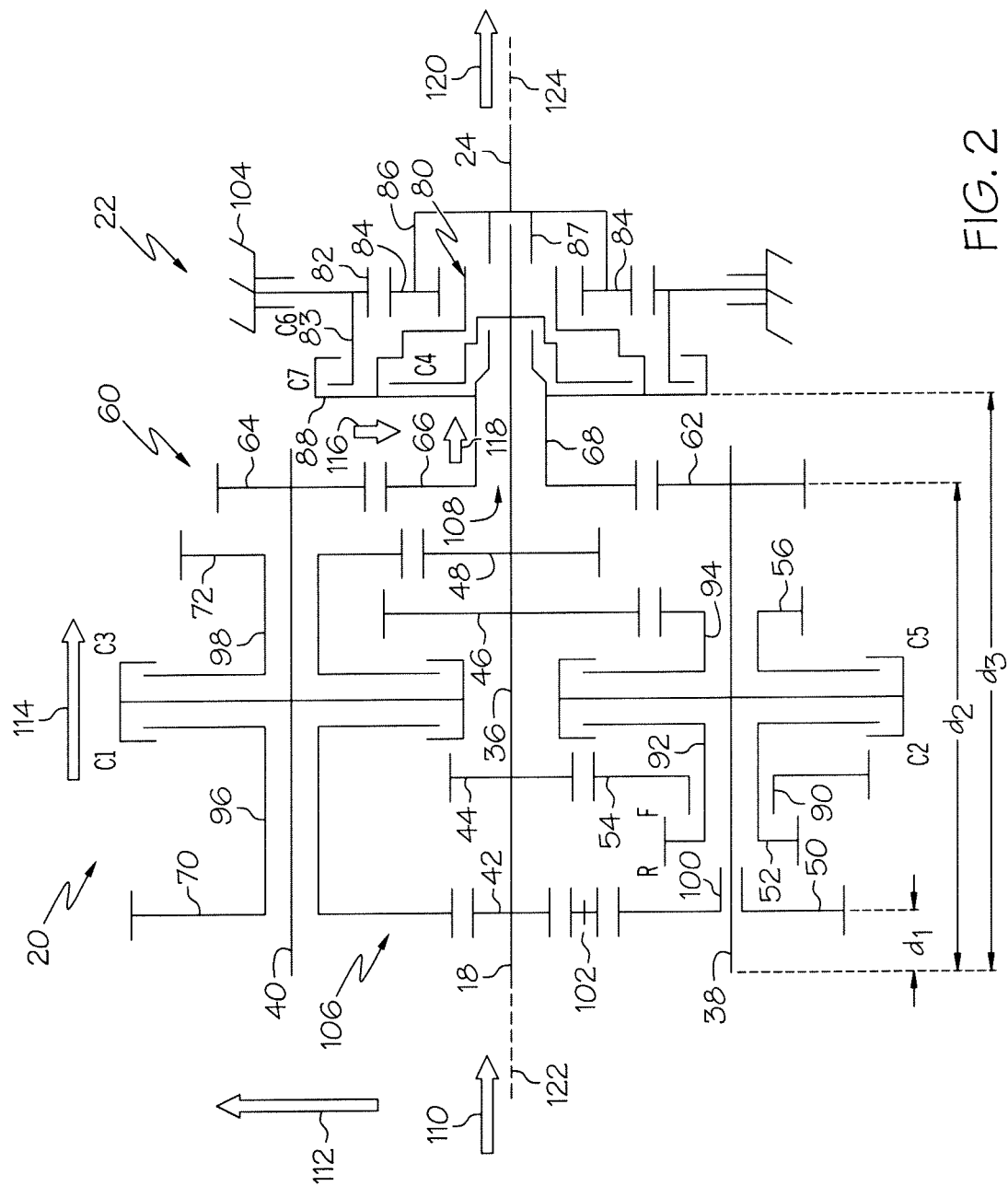
FIG. 2 is a schematic diagram of one embodiment of a multi-speed countershaft transmission gear assembly in accordance with the present invention, showing connection of the input member to a main shaft and countershaft gears and an output gear set spaced from the input member; also showing connection of the countershaft output to a rear planetary gear set with a plurality of selectively engageable torque transmitting mechanisms.

As shown in FIG. 2, countershaft gear assembly 20 does not require any headset gears or head gear sets. Instead, main shaft 36 is directly coupled to input member 18 for common rotation therewith. As a result, countershaft gears 54, 56, 70, 72 intermesh directly with main shaft gears 44, 46, 42, 48, and are thereby input (turbine) driven. Also, the need for a direct shaft in addition to main shaft 36 is eliminated.

Direct coupling of the main shaft 36 and counter shaft gears 54, 56, 70, 72 to input member 18 enables or facilitates a variety of power take-off (PTO) options, which may be turbine driven (e.g. by turbine 32) as a result of this configuration. In the illustrated embodiment, any of the gear elements 42, 44, 46, 48, 50, 54, 56, 70, 72, or 102 may be used as a turbine driven PTO by intermeshing a PTO gear therewith. As such, transmission 21 does not restrict PTO applications to any particular location of gear assembly 20.

The lack of need for a direct shaft in addition to a main shaft may reduce the overall part count for the countershaft gear assembly 20, relative to other known countershaft gear assemblies. Benefits of the presently disclosed configuration may include reduced overall length, weight and cost of the transmission. Additionally, the elimination of a separate direct shaft may reduce torsional effects.

In addition to main shaft 36, countershaft gear assembly 20 includes first and second countershafts 38, 40 and a reverse idler 102. Countershafts 38, 40 and reverse idler 102 are spaced from and generally parallel to main shaft 36. However, main shaft 36, countershafts 38, 40, and reverse idler 102 are not required to be coplanar, although some or all of these elements may be coplanar in certain embodiments. For example, in one embodiment, countershafts 38, 40 are substantially coplanar with each other but main shaft 36 and reverse idler 102 are not coplanar with countershafts 38, 40 and are also not coplanar with each other. In other words, the spacing and configuration of main shaft 36, countershafts 38, 40, and reverse idler 102 is adaptable to varying packaging and gear arrangement requirements, and the described configuration is just one example of many possible spacing configurations of these elements.

Gear assembly 20 has a plurality of main shaft gears 42, 44, 46, 48, each of which is coupled for common rotation with main shaft 36. Gear assembly 20 also has a plurality of range gears 50, 54, 56, 70, 72, which are operable to enable transmission 21 to achieve a plurality of forward and reverse speed ratios via selective application of torque transmitting mechanisms C1, C2, C3, C4, C5, C6, C7 and synchronizer 52, as described herein.

First countershaft 38 has a plurality of countershaft range gears 50, 54, and 56, and a synchronizer 52, each of which is rotatable about and concentric with first countershaft 38. Second countershaft 40 has a plurality of countershaft gears 70, 72, each of which is rotatable about and concentric with second countershaft 40.

Gears 42, 44, 46, 48 of main shaft 36 are intermeshable with countershaft gears 70, 54, 56, 72, respectively. In general, the countershaft gears that mesh with main shaft gears are input driven (i.e. by turbine 32) in the illustrated embodiment.

Main shaft gear 42 also intermeshes with reverse idler 102. Countershaft gear 50 uses idler 102 and synchronizer 52 to provide the one or more reverse ranges. Synchronizer 52 is movable in direction 'R' to achieve a reverse range and is movable in direction 'F' to achieve a forward range. Movement of synchronizer 52 in direction 'R' couples sleeve shaft or C2 clutch hub 92 with sleeve shaft 100 for common rotation therewith. Movement of synchronizer 52 in direction 'F' couples sleeve shaft or C2 clutch hub 92 with sleeve shaft 90 for common rotation therewith.

Main shaft gear 44 intermeshes with first countershaft gear 54. First countershaft gear 54 is supported by and rotatable about first countershaft 38 with sleeve shaft 90. Main shaft gear 46 intermeshes with first countershaft gear 56. First countershaft gear 56 is supported by and rotatable about first countershaft 38 with sleeve shaft or C5 clutch hub 94.

Main shaft gear 42 also intermeshes with second countershaft gear 70. Second countershaft gear 70 is supported by and rotatable about second countershaft 40 with sleeve shaft or C1 clutch hub 96. Main shaft gear 48 intermeshes with second countershaft gear 72. Second countershaft gear 72 is supported by and rotatable about second countershaft 40 with sleeve shaft or C3 clutch hub 98.

Gear assembly 20 has an input end 106 near input member 18 and an output end 108 near output gear assembly 60. Each of main shaft 36 and countershafts 38, 40 has an input end near or generally aligned with the input end 106 and an output end near or generally aligned with the output end 108 of gear assembly 20.

Output gear set 60 is disposed near output end 108, between the countershaft gears and rear planetary gear set 22. In the embodiment of FIG. 2, countershaft gears 70 and 50 are positioned a first distance $d_1$ from the input end 106 of main shaft 18, output gear set 60 is positioned a second distance $d_2$ from input end 106, and planetary gear set 22 is positioned a third distance $d_3$ from input end 106. Second distance $d_2$ is greater than first distance $d_1$, and third distance $d_3$ is greater than second distance $d_2$.

Output gear set 60 includes gears 62, 64, 66. Gear 62 is concentric with and coupled for common rotation with first countershaft 38. Gear 64 is concentric with and coupled for common rotation with second countershaft 40. Gear 66 continuously intermeshes with gears 62 and 64. Gear 66 is supported on and rotatable with countershaft output member 68. Countershaft output member 68 is concentric with and rotatable about main shaft 36.

Output gear set 60 provides torque multiplication at or near the output end 108, rather than at or near the input end 106, of gear assembly 20. Also, by eliminating the need for head gear sets and providing torque multiplication near output end 108, torque may be reduced in many or most of the countershaft gears and may result in a net reduction in the overall length of the countershaft gear assembly 20 from input end 106 to output end 108.

Input member 18 has a longitudinal axis 122 and output member 24 has a longitudinal axis 124. Axes 122, 124 may be generally aligned, as shown in FIG. 2, for example. Main shaft 36 also has an axis (not shown), which is generally aligned with at least axis 122. In the illustrated embodiment, the axis of main shaft 36 is generally aligned with both of axes 122, 124. Accordingly, the illustrated embodiment of transmission 21 may be referred to as an "in-line" transmission. Many in-line transmissions are used with rear-wheel drive vehicles. However, one of ordinary skill in the art will understand that transmission 21 may be adapted for use with vehicles that have rear-wheel, front-wheel or all-wheel drive capabilities, and that aspects of the present invention are applicable to other types of countershaft transmissions.

Transmission 21 includes a plurality of torque transmitting mechanisms. In the illustrated embodiment, countershaft gear assembly 20 includes four torque transmitting mechanisms, C1, C2, C3 and C5, while planetary gear set 22 includes three torque transmitting mechanisms C4, C6, and C7. C1 is a rotating clutch supported on the second countershaft 40 and is selectively engageable to couple gear 70 for common rotation with second countershaft 40. C2 is a rotating clutch supported on the first countershaft 38 and is selectively engageable to couple gear 54 for common rotation with first countershaft 38 when synchronizer 52 is in the 'F' position. When synchronizer 52 is in the "R" position, torque transmitting mechanism C2 engages gear 50.

C3 is a rotating clutch supported on the second countershaft 40 and is selectively engageable to couple gear 72 for common rotation with second countershaft 40. C5 is a rotating clutch supported on the first countershaft 38 and is selectively engageable to couple gear 56 for common rotation with first countershaft 38.

By applying any of the clutches C1, C2, C3, C5, which synchronize a gear to a countershaft 38, 40, the respective countershaft 38, 40 then transfers torque to the output gear set 60. The output gear set 60 then provides torque input to the planetary gear set 22.

C4 is a bypass or direct drive clutch that is selectively engageable to couple main shaft 36 for common rotation with hub member 88, bypassing the first and second countershafts 38, 40. When C4 is engaged, torque is transferred directly from input member 18 to planetary gear set 22. In this way, the need for a direct shaft in addition to the main shaft is eliminated. In the embodiment of FIG. 2, C4 has a smaller diameter than C7. Also, C4 is effectively "nested" within the diameter of C7, to minimize the axial length of transmission 21, or for other reasons. In other embodiments, C4 may be spaced apart from and not nested with C7.

C7 is a rotating clutch that is selectively engageable to cause the entire planetary gear set 22 to rotate at the same speed as output gear 66 via shaft 68 and hub member 88. When C7 is engaged, two members of planetary gear set 22 are connected for common rotation.

C6 is a brake, grounded clutch, or stationary clutch. C6 is selectively engageable to couple the ring gear 82 with the transmission housing 104 or other stationary member, thereby holding the ring gear 82 stationary while other members of the planetary gear set 22 rotate.

Each of torque transmitting mechanisms C1, C2, C3, C4, C5, C6, and C7 can be spaced and configured independently of the other. The spacing and configuration requirements of C1, C2, C3, C4, C5, C6, and C7 may be determined by other requirements of transmission 21, such as countershaft spacing requirements.

Rear planetary gear set 22 generally acts as a two-speed module, providing a first speed when torque transmitting mechanism C6 is applied and a second speed when torque transmitting mechanism C7 is applied. The ratio through the planetary gear set 22 depends on whether C6 or C7 is applied.

Rear planetary gear set 22 is disposed between gear assembly 20 and output member 24. Rear planetary gear set 22 includes a sun gear 80, a ring gear 82, a plurality of pinion or planet gears 84 and a pinion or planet gear carrier 86, which is coupled for common rotation with output member 24. Rear planetary gear set 22 is coupled to countershaft output member 68 via a hub member 88.

In some embodiments, a rear member 87 supports main shaft 36, while in other embodiments, rear member 87 does not support main shaft 36. For example, in some embodiments, rear member 87 is a bushing that provides a seal for main shaft 36 but does not transfer gear loads from main shaft 36. In other words, rear member 87 may or may not be used to transfer torque, according to the requirements of a particular design. As such, rear member 87 may be a bushing, bearing, or the like. Alternatively, rear support member 87 may be eliminated entirely, in which case main shaft 36 may be shortened. In some embodiments, main shaft 36 may be supported by countershaft output member 68 and gear 66 that are in turn supported by a housing (not shown). For example, a bearing (not shown) may be located between main shaft 36 and countershaft output member 68. The housing may be located in front of or adjacent to the torque transmitting mechanisms C4, C7; i.e. between the torque transmitting mechanisms C4, C7 and the output gear set 60.

Rear planetary gear set 22 can operate with the ring gear 82 grounded, the sun gear 80 receiving input from the countershafts 38, 40, and the carrier 86 providing output, or with at least two components of rear planetary gear set 22 held or locked for common rotation, to give a one to one ratio of sun gear 80 speed to pinion gear carrier 86 speed in order to synchronize countershaft output member 68 speed with output member 24 speed. One of ordinary skill in the art will understand that aspects of the present invention may be applied to countershaft transmissions with or without a planetary gear set.

C7 is selectively engageable to lock two components of the rear planetary gear set 22 for common rotation to provide a one to one ratio of output gear 66 speed to output member 24 speed. In one illustrative example, C7 selectively locks the sun gear 80 for common rotation with the ring gear 82 by engaging a flange 83 coupled to ring gear 82 as suggested, for example, in FIG. 2. C7 is supported by and rotates with hub member 88 and shaft 68. In response to the sun gear 80 and the ring gear 82 being locked together for common rotation, the planet gears 84 are trapped so to speak between the sun gear 80 and the ring gear 82, so that the planet gears 84 remain stationary relative to the pinion gear carrier 86, and torque is transmitted through the pinion gear carrier 86 to output member 24.

FIG. 3 is a table showing one example of how the shift sequences of transmission 21 may be configured for operation. In the first column, R1 and R2 are reverse ranges, and there are ten forward ranges. The torque transmitting mechanisms that are applied in each range are marked with an "X." The position of synchronizer 52 (R or F) is indicated in the last column of the table.

In the example of FIG. 3, torque transmitting mechanism C2 is applied to achieve a reverse range, when synchronizer 52 is in the "R" position. A first reverse speed ratio, R1, is achieved when torque transmitting mechanisms C2 and C6 are applied and synchronizer 52 is in the "R" position. A second reverse speed ratio, R2, is achieved when torque transmitting mechanisms C2 and C7 are applied and synchronizer 52 is in the "R" position.

Torque transmitting mechanism C2 is also used to achieve the second and seventh forward ranges, when synchronizer 52 is moved to the "F" position. To achieve the second forward speed ratio, torque transmitting mechanisms C2 and C6 are applied and synchronizer 52 is in the "F" position. To achieve the seventh forward speed ratio, torque transmitting mechanisms C2 and C7 are applied and synchronizer 52 is in the "F" position. In this way, torque transmitting mechanism C2 is shared by forward and reverse ratios, depending on the position of synchronizer 52. However, reverse range could share any of torque transmitting mechanisms C1, C3, or C5 with a forward range in a similar manner, depending on the gear ratios that are desired. In other words, reverse is not limited to sharing with any specific range gear, except by the desired gear ratios.

When the shared torque transmitting mechanism (C2, in the example of FIG. 3) is not applied, synchronizer 52 may be in either the "R" or the "F" position, or in a neutral position therebetween. In other words, in the illustrated embodiment, two torque transmitting mechanisms are applied independently of synchronizer 52 in any range, except for the shared ranges (in which synchronizer 52 is actuated, in addition to two torque transmitting mechanisms).

The shift sequences shown in FIG. 3 are illustrative; they can be modified depending on the particular gear ratios desired. For example, torque transmitting mechanism C5 could be applied before torque transmitting mechanism C4 (in which case the numbering of C4 and C5 would likely be reversed). In this situation, the direct range (i.e., C4) would be run in the fifth and tenth ranges instead of the fourth and ninth ranges.

Figure 4:
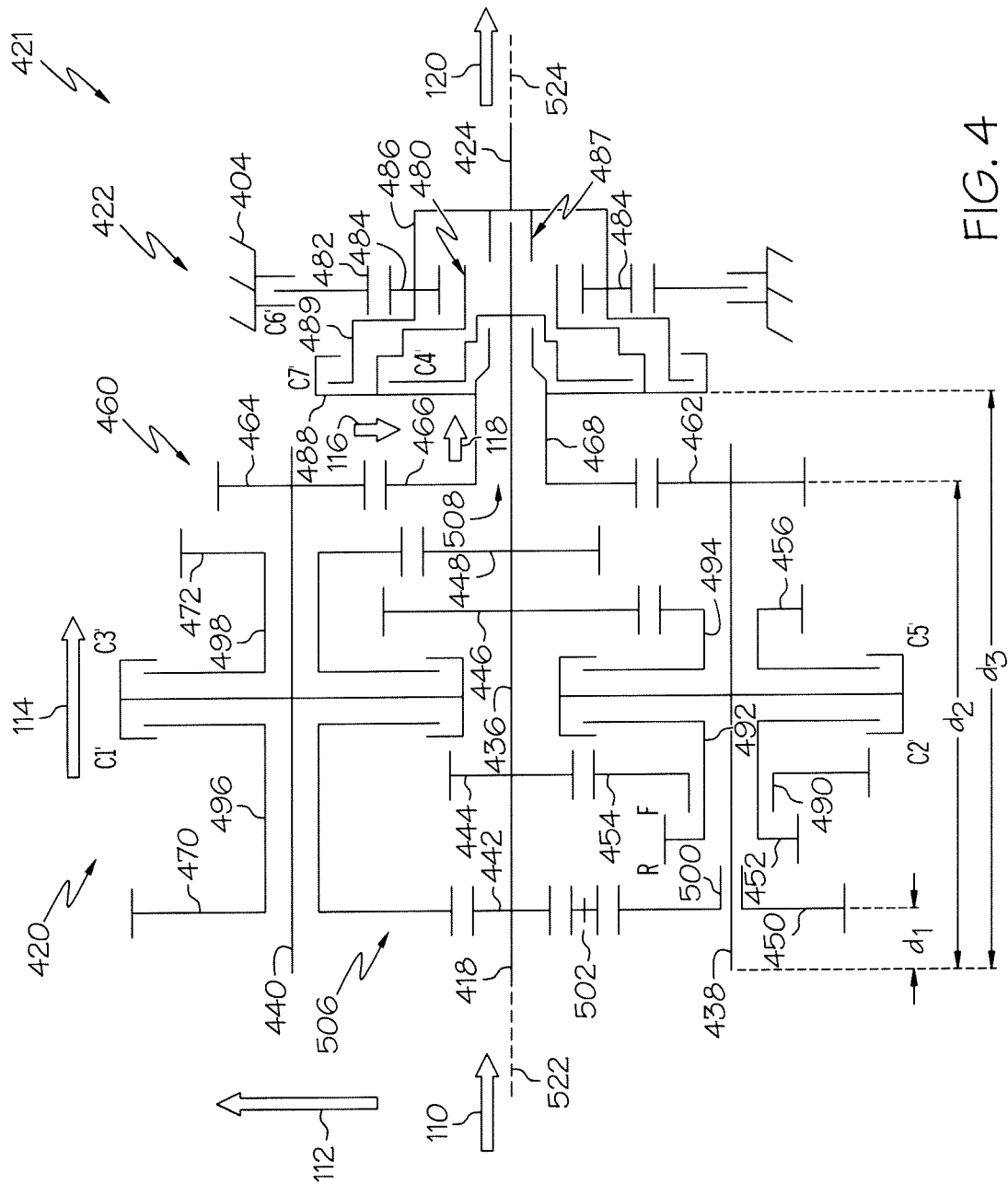
FIG. 4 is a schematic diagram of another embodiment of a multi-speed countershaft transmission gear assembly in accordance with the present invention, showing connection of the input member to a main shaft and countershaft gears and an output gear set spaced from the input member; also showing connection of the countershaft output to a rear planetary gear set with a plurality of selectively engageable torque transmitting mechanisms.

Another illustrative countershaft transmission 421 for use in a vehicle is shown in FIG. 4. Transmission 421 is illustratively configured for use in powertrain 10 with drive unit 12 and torque transferring apparatus 16 to transmit torque from drive unit 12 to drive a vehicle load 26 as described above with regard to transmission 21. Additionally, transmission 421 is like transmission 21 in that it may be operable to provide up to ten forward speed ratios and up to two reverse speed ratios, although this is not required.

Transmission 421 illustratively includes a countershaft gear assembly 420, an output gear set 460, a rear planetary gear set 422, and a plurality of torque transmitting mechanisms (C1', C2', C3', C4', C5', C6', and C7'). Gear assembly 420 includes a main shaft 418 and is substantially similar to gear assembly 20 shown in FIG. 2 and similar parts are denoted by like reference numbers in the 400 series and the 500 series. Output gear set 460 is substantially similar to output gear set 60 shown in FIG. 2 and similar parts are denoted by like reference numbers in the 400 series and the 500 series.

The configuration of the rear planetary gear set 422 of transmission 421, shown illustratively in FIG. 4, differs from the rear planetary gear set 22, shown illustratively in FIG. 2, in some respects. Rear planetary gear set 422 is disposed between gear assembly 420 and an output member 424. Rear planetary gear set 422 includes a sun gear 480, a ring gear 482, a plurality of pinion or planet gears 484, and a pinion or planet gear carrier 486. Sun gear 480 is coupled with output gear 466, countershaft output member 468, and hub 488 for rotation therewith. Pinion gear carrier 486 is coupled for common rotation with output member 424 and with a flange 489 that extends from the pinion gear carrier 486 toward the input shaft 418.

A rear member 487 is coupled to main shaft 436, and is substantially similar to rear member 87 shown illustratively in FIG. 2. Rear member 487 may or may not support main shaft 436, or may be eliminated entirely, as described above with reference to rear member 87.

Rear planetary gear set 422 generally acts as a two-speed module, in a first mode providing a first speed when torque transmitting mechanism C6' is applied and in a second mode providing a second speed when torque transmitting mechanism C7' is applied. In the first mode, rear planetary gear set 422 operates with the ring gear 482 grounded, the sun gear 480 receiving input from the countershafts 438, 440, and the carrier 486 providing output. In the second mode, at least two components of rear planetary gear set 422 are held or locked for common rotation to give a one to one ratio of output gear 466 speed to output member 424 speed. Thus, the ratio through the planetary gear set 422 depends on whether C6' or C7' is applied.

Torque transmitting mechanisms C1', C2', C3', C4', C5' and C6' included in transmission 421 are substantially similar to countershaft torque transmitting mechanisms C1, C2, C3, C4, C5, and C6 included in transmission 21 and described above. C7' of transmission 421 differs from C7 of transmission 21 in structural arrangement but similarly functions to selectively connect two members of the planetary gear set 422 for common rotation as described below.

As shown in FIG. 4, C7' of transmission 421 is selectively engageable to hold or lock two components of the rear planetary gear set 422 for common rotation, to provide a one to one ratio of output gear 466 speed relative to output member 24 speed. C7' selectively locks the sun gear 480 to the pinion gear carrier 486 for common rotation therewith by engaging flange 489 as suggested, for example, in FIG. 4. In response to the sun gear 480 and the pinion gear carrier 486 being locked together for common rotation, torque is transmitted from the hub member 488 through pinion gear carrier 486 to output member 424 without loading the planetary gears 484. C7' is illustratively supported by and rotates with hub member 488 and shaft 468. In operation, locking the driven sun gear 480 to the pinion gear carrier 486 may provide a one to one ratio without loading the planet gears 484. Such a configuration may be designed to reduce the occurrence of brinelling, or material surface damage, imposed on the planet gears 484, or for other reasons.

Similar to the embodiment of FIG. 2, the torque transmitting mechanism C4' has a smaller diameter than the torque transmitting mechanism C7'. Additionally, C4' is effectively "nested" with C7' in the illustrated example.

Transmission 421 has a plurality of operating modes, ranges or ratios, including at least one forward speed ratio, neutral and at least one reverse speed ratio. More particularly, in the illustrated embodiment, transmission 421 is operable to provide up to ten forward speed ratios and up to two reverse speed ratios. The up to ten forward speed ratios are provided by at least one direct range, a plurality of countershaft ranges and a plurality of planetary ranges. In the embodiment shown in FIG. 4, there are four countershaft ranges (C1', C2', C3' and C5'), one direct range (C4') and two planetary ranges (C6' and C7'). Thus, in the illustrated embodiment, the main shaft is effectively also the direct shaft, thereby eliminating the need for a separate direct shaft.

The countershaft ranges are attained by selectively applying the countershaft torque transmitting mechanisms, i.e., C1', C2', C3', and C5'. The planetary ranges are attained by selectively applying the planetary torque transmitting mechanisms, i.e., C6' and C7', and the direct range is attained by selectively applying the direct torque transmitting mechanism, C4'. One example of how torque transmitting mechanisms C1', C2', C3', C4', C5', C6' and C7' may be applied to achieve ten forward ratios and two reverse ratios is shown by the table of FIG. 3. One of ordinary skill in the art will understand, however, that shift sequences may be modified or eliminated to obtain a particularly desired number of ratios, and that the gear ratios themselves may be modified. For example, shift sequences may be modified so that a range is skipped, thereby resulting in fewer forward speed ratios (i.e., nine instead of ten). Accordingly, aspects of the present invention are not limited to any particular configuration of shift sequences or to any specific set of gear ratios.

Figure 5:
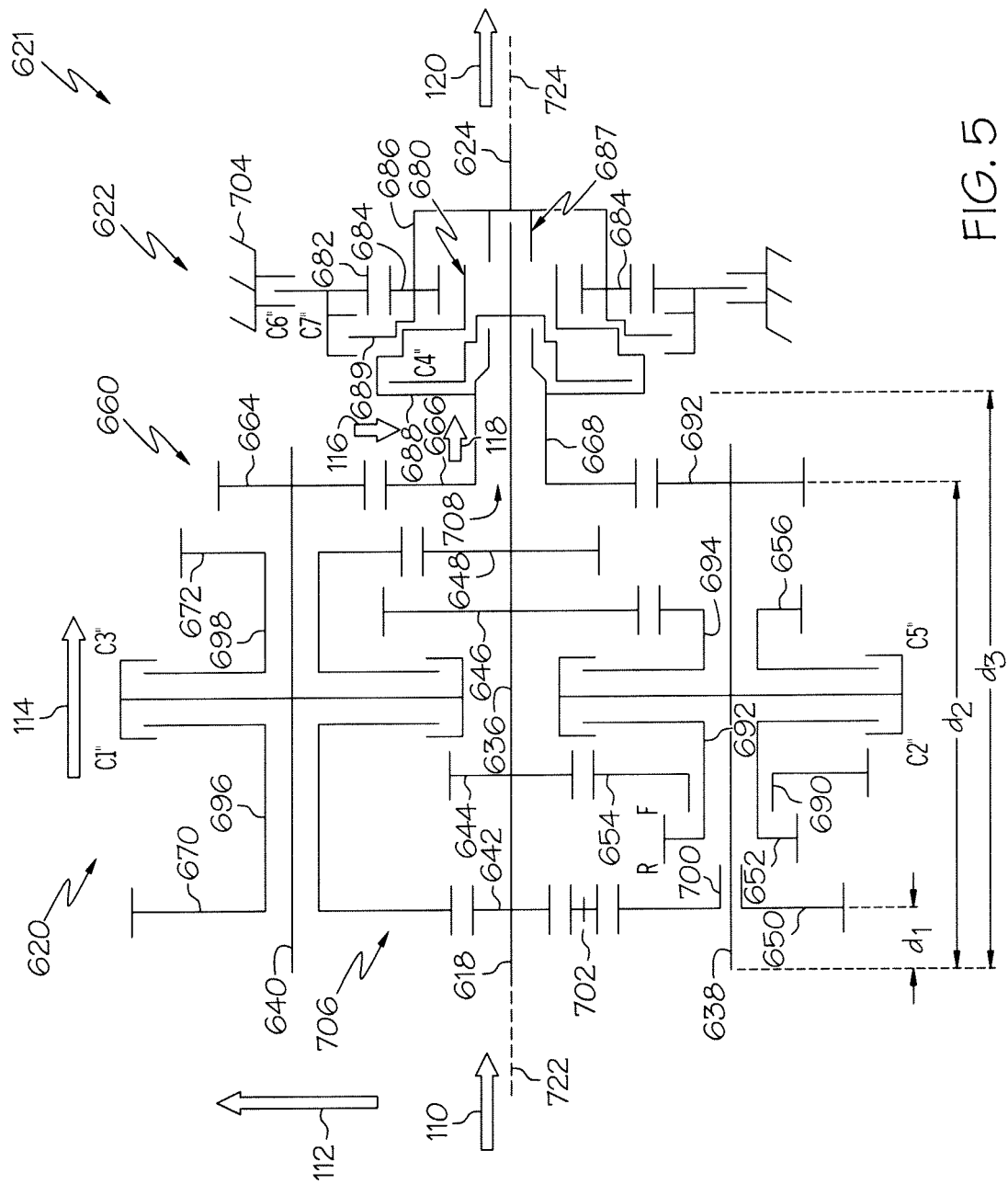
FIG. 5 is a schematic diagram of yet another embodiment of a multi-speed countershaft transmission gear assembly in accordance with the present invention, showing connection of the input member to a main shaft and countershaft gears and an output gear set spaced from the input member; also showing connection of the countershaft output to a rear planetary gear set with a plurality of selectively engageable torque transmitting mechanisms.

Another illustrative countershaft transmission 621 for use in a vehicle is shown in FIG. 5. Transmission 621 is illustratively configured for use in powertrain 10 with drive unit 12 and torque transferring apparatus 16 to transmit torque from drive unit 12 to drive a vehicle load 26 as described above with regard to transmission 21. Additionally, transmission 621 is like transmission 21 in that it may be operable to provide up to ten forward speed ratios and up to two reverse speed ratios, although this is not required.

Transmission 621 illustratively includes a countershaft gear assembly 620, an output gear set 660, a rear planetary gear set 622, and a plurality of torque transmitting mechanisms (C1", C2", C4", C5", C6", and C7"). Gear assembly 620 is substantially similar to gear assembly 20 shown in FIG. 2 and similar parts are denoted by like reference numbers in the 600 series and 700 series. Output gear set 660 is substantially similar to output gear set 60 shown in FIG. 2 and similar parts are denoted by like reference numbers in the 600 series and 700 series.

The configuration of rear planetary gear set 622 of transmission 621, shown illustratively in FIG. 5, differs from that of the rear planetary gear set 22 of transmission 21, shown illustratively in FIG. 2, and that of the rear planetary gear set 622, shown illustratively in FIG. 4, in some respects. Rear planetary gear set 622 is disposed between gear assembly 620 and output member 624. Rear planetary gear set 622 includes a sun gear 680, a ring gear 682, a plurality of pinion or planet gears 684, and a pinion or planet gear carrier 686. Sun gear 680 is coupled with output gear 666, countershaft output member 668, and hub 688 for rotation therewith. Pinion gear carrier 686 is coupled for common rotation with output member 624 and with a flange 689 that extends from pinion gear carrier 686 toward the input shaft 618.

A rear member 687 is coupled to main shaft 636, and is substantially similar to rear member 87 shown illustratively in FIG. 2. Rear member 687 may or may not support main shaft 636, or may be eliminated entirely, as described above with reference to rear member 87.

Rear planetary gear set 622 generally acts as a two-speed module, in a first mode providing a first speed when torque transmitting mechanism C6" is applied and in a second mode providing a second speed when torque transmitting mechanism C7" is applied. In the first mode, rear planetary gear set 622 operates with the ring gear 682 grounded, the sun gear 680 receiving input from the countershafts 638, 640, and the carrier 686 providing output. In the second mode, at least two components of rear planetary gear set 622 are held or locked to give a one to one ratio of output speed to output member 624 speed. Thus, the ratio through the planetary gear set 622 depends on whether C6" or C7" is applied.

Torque transmitting mechanisms C1", C2", C3", C4", C5" and C6" included in transmission 621 are substantially similar to countershaft torque transmitting mechanisms C1, C2, C3, C4, C5, and C6 included in transmission 21 and described above. C7" of transmission 621 differs from C7 of transmission 21 in structural arrangement but similarly functions to selectively connect two members of the planetary gear set 622 for common rotation as described below.

As shown in FIG. 5, C7" of transmission 621 is selectively engageable to hold or lock two components of the rear planetary gear set 622 for common rotation to provide a one to one ratio of output gear 666 speed to output member 624 speed. C7" selectively locks the ring gear 682 to the pinion gear carrier 686 by engaging flange 689 as suggested, for example, in FIG. 5. In response to the ring gear 682 and the pinion gear carrier 686 being locked together for common rotation, torque is transmitted from the countershaft output member 668 to output member 624 through the sun gear 680. C7" is illustratively supported by and rotates with ring gear 682.

Unlike the embodiments of FIGS. 2 and 4, in the embodiment of FIG. 5, the torque transmitting mechanism C4" has a smaller diameter than C7", but is not "nested" with C7".

Transmission 621 has a plurality of operating modes, ranges or ratios, including at least one forward speed ratio, neutral and at least one reverse speed ratio. More particularly, in the illustrated embodiment, transmission 621 is operable to provide up to ten forward speed ratios and up to two reverse speed ratios. The up to ten forward speed ratios are provided by at least one direct range, a plurality of countershaft ranges and a plurality of planetary ranges. In the embodiment shown in FIG. 5, there are four countershaft ranges (C1", C2", C3" and C5"), one direct range (C4") and two planetary ranges (C6" and C7"). Thus, in the illustrated embodiment, the main shaft is effectively also the direct shaft, thereby eliminating the need for a separate direct shaft.

The countershaft ranges are attained by selectively applying the countershaft torque transmitting mechanisms, i.e., C1", C2", C3", and C5". The planetary ranges are attained by selectively applying the planetary torque transmitting mechanisms, i.e., C6" and C7", and the direct range is attained by selectively applying the direct torque transmitting mechanism, C4". One example of how torque transmitting mechanisms C1", C2", C3", C4", C5", C6" and C7" may be applied to achieve ten forward ratios and two reverse ratios is shown by the table of FIG. 3. One of ordinary skill in the art will understand, however, that shift sequences may be modified or eliminated to obtain a particularly desired number of ratios, and that the gear ratios themselves may be modified. For example, shift sequences may be modified so that a range is skipped, thereby resulting in fewer forward speed ratios (i.e., nine instead of ten). Accordingly, aspects of the present invention are not limited to any particular configuration of shift sequences or to any specific set of gear ratios.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. A vehicle transmission comprising
a main shaft having an input end, an output end spaced from the input end, and at least one main shaft gear positioned between the input end and the output end for common rotation with the main shaft,
a plurality of countershafts spaced from and substantially parallel to the main shaft,
at least one countershaft gear selectively rotatable about one of the plurality of countershafts and the at least one countershaft gear intermeshing with the at least one main shaft gear,
a planetary gear set including a plurality of planet gears and a gear carrier rotatable about the output end of the main shaft and supporting the plurality of planet gears,
a first torque transmitting mechanism selectively engageable to hold the planet gears stationary relative to the gear carrier,
an output shaft coupled to the planet gear carrier for rotation therewith,
a sleeve shaft concentric with and rotatable around the output end of the main shaft,
a second torque transmitting mechanism arranged to selectively lock the sleeve shaft to the main shaft for common rotation therewith,
and an output gear set including a first output gear coupled for rotation with the sleeve shaft and a second output gear coupled for rotation with one of the plurality of countershafts and intermeshing with the first output gear,
wherein the first output gear is the only gear coupled for rotation with the sleeve shaft and intermeshing with a gear coupled for rotation with one of the plurality of countershafts.

2. The vehicle transmission of claim 1, wherein the planetary gear set is situated between the output gear set and the output shaft.

3. The vehicle transmission of claim 1, wherein the first torque transmitting mechanism is arranged to selectively lock the gear carrier to the sleeve shaft for common rotation therewith.

4. The vehicle transmission of claim 1, wherein the planetary gear set includes a sun gear and the first torque transmitting mechanism is selectively engageable to lock the gear carrier for common rotation with the sun gear.

5. The vehicle transmission of claim 1, wherein the first torque transmitting mechanism is supported by and rotates with the sleeve shaft and the second torque transmitting mechanism is supported by and rotates with the main shaft.

6. The vehicle transmission of claim 1, wherein the second torque transmitting mechanism is nested within the diameter of the first torque transmitting mechanism.

7. The vehicle transmission of claim 1, wherein the planetary gear set includes a ring gear and the first torque transmitting mechanism is arranged to selectively lock the gear carrier for common rotation with the ring gear.

8. The vehicle transmission of claim 1, wherein the at least one main shaft gear intermeshes with only one gear selectively coupled for rotation about one of the plurality of countershafts.

9. The vehicle transmission of claim 1, wherein the output gear set includes a third output gear coupled for rotation with one of the plurality of countershafts and intermeshing with the first output gear.

10. A vehicle transmission comprising
a main shaft having an input end, an output end spaced from the input end, and at least one main shaft gear positioned between the input end and the output end for common rotation with the main shaft,
a plurality of countershafts spaced from and substantially parallel to the main shaft,
at least one countershaft gear selectively rotatable about one of the plurality of countershafts and the at least one countershaft gear intermeshing with the at least one main shaft gear,
a planetary gear set including a plurality of planet gears and a gear carrier rotatable about the output end of the main shaft and supporting the plurality of planet gears,
a first torque transmitting mechanism comprising a single clutch selectively engageable to hold the planet gears stationary relative to the gear carrier,
an output shaft coupled to the planet gear carrier for rotation therewith,
a sleeve shaft concentric with and rotatable around the output end of the main shaft,
and an output gear set including a first output gear coupled for rotation with the sleeve shaft and a second output gear coupled for rotation with one of the plurality of countershafts and intermeshing with the first output gear,
wherein the first output gear is the only gear coupled for rotation with the sleeve shaft and intermeshing with a gear coupled for rotation with one of the plurality of countershafts.

11. The vehicle transmission of claim 10, wherein the planetary gear set is situated between the output gear set and the output shaft.

12. The vehicle transmission of claim 10, wherein the first torque transmitting mechanism is arranged to selectively lock the gear carrier to the sleeve shaft for common rotation therewith.

13. The vehicle transmission of claim 10, wherein the planetary gear set includes a sun gear and the first torque transmitting mechanism is selectively engageable to lock the gear carrier for common rotation with the sun gear.

14. The vehicle transmission of claim 10, further comprising a second torque transmitting mechanism arranged to selectively lock the sleeve shaft to the main shaft for common rotation therewith.

15. The vehicle transmission of claim 14, wherein the first torque transmitting mechanism is supported by and rotates with the sleeve shaft and the second torque transmitting mechanism is supported by and rotates with the main shaft.

16. The vehicle transmission of claim 14, wherein the second torque transmitting mechanism is nested within the diameter of the first torque transmitting mechanism.

17. The vehicle transmission of claim 10, wherein the planetary gear set includes a ring gear and the first torque transmitting mechanism is arranged to selectively lock the gear carrier for common rotation with the ring gear.

18. The vehicle transmission of claim 10, wherein the at least one main shaft gear intermeshes with only one gear selectively coupled for rotation about one of the plurality of countershafts.

19. The vehicle transmission of claim 10, wherein the output gear set includes a third output gear coupled for rotation with one of the plurality of countershafts and intermeshing with the first output gear.

* * * * *